(12) United States Patent
Levitan

(10) Patent No.: US 7,689,816 B2
(45) Date of Patent: Mar. 30, 2010

(54) BRANCH PREDICTION WITH PARTIALLY FOLDED GLOBAL HISTORY VECTOR FOR REDUCED XOR OPERATION TIME

(75) Inventor: David S. Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 12/023,154

(22) Filed: Jan. 31, 2008

(65) Prior Publication Data

US 2009/0198983 A1 Aug. 6, 2009

(51) Int. Cl.
G06F 9/38 (2006.01)
(52) U.S. Cl. .................................. 712/239; 712/240
(58) Field of Classification Search .................. None
See application file for complete search history.

(56) References Cited

U.S. PATENT DOCUMENTS 7,000,096 B1 * 2/2006 Sinharoy ................ 712/239
7,243,219 B2 * 7/2007 Jourdan et al. ........... 712/239
2008/0276081 A1 * 11/2008 Nair ...................... 712/240
2009/0037709 A1 * 2/2009 Ishii ...................... 712/240

* cited by examiner

*Primary Examiner*—Kenneth S Kim
(74) *Attorney, Agent, or Firm*—Diana R. Gerhardt; Dillon & Yudell, LLP

(57) ABSTRACT

A global history vector (GHV) mechanism maintains a folded (XORed) GHV with higher order entries and an unfolded (no XORed) GHV with lower order entries. When a new entry arrives at the GHV, the GHV mechanism performs an XOR of the oldest unfolded entry in the unfolded GHV with the new entry. The XOR result is then shifted into the folded GHV as the newest folded entry. The oldest folded entry is discarded during the shift in of the newest folded entry. The GHV mechanism thus provides a resulting folded GHV that is current and can be utilized for XORing with an IFAR by performing an XOR operation. Only a single XOR logic is required to perform a single bit XOR operation between the oldest entry and the youngest entry, resulting in reducing the cycle time required to complete the folding (XORing) operation on a GHV.

12 Claims, 4 Drawing Sheets

BIT VALUES AT T0

FOLDED GHV 205

| 0 | 1 | 2 | 3 | 4 | 5 | 6 | F | 8 | 9 | 10 |
|---|---|---|---|---|---|---|---|---|---|---|
| 1 | 0 | 0 | 1 | 0 | 1 | 0 | 0 | 0 | 0 | 0 |

UNFOLDED GHV 200

| 11 | 12 | 13 | 14 | 15 | 16 | 17 | 18 | 19 |
|----|----|----|----|----|----|----|----|----|
| 0  | 1  | 1  | 1  | 0  | 1  | 0  | 0  | 0  |

BIT VALUES AT T1
(AFTER RECEIVING BRANCH RESULT OF 1)

FOLDED GHV 205

| 0 | 1 | 2 | 3 | 4 | 5 | 6 | F | 8 | 9 | 10 |
|---|---|---|---|---|---|---|---|---|---|---|
| 0 | 0 | 1 | 0 | 1 | 0 | 0 | 0 | 0 | 0 | 1 |

UNFOLDED GHV 200

| 11 | 12 | 13 | 14 | 15 | 16 | 17 | 18 | 19 |
|----|----|----|----|----|----|----|----|----|
| 1  | 1  | 1  | 0  | 1  | 0  | 0  | 0  | 1  |

*Fig. 2*

# BRANCH PREDICTION WITH PARTIALLY FOLDED GLOBAL HISTORY VECTOR FOR REDUCED XOR OPERATION TIME

BACKGROUND

1. Technical Field

The present invention generally relates to computer systems and in particular to branch prediction tracking mechanisms. Still more particularly, the present invention relates to global history vectors utilized with branch prediction and folding techniques for optimizing timing.

2. Description of the Related Art

Branch prediction, and in particular global branch prediction, is known in the art. Global branch prediction involves making a branch prediction based on the path of execution, i.e., the history of the last few branches to have been executed. Global branch prediction may implement a special shift-register storing a bit-vector, referred to as a "global history vector," that represents the recent path of execution. The global history vector may store n bits of data, with each bit of data associated with a group of instructions. The position of a bit in the global history vector corresponds to how recently the associated group of instructions was fetched. For example, the least significant bit in the global history vector may represent the most recent fetch and the $n^{th}$ most significant bit may represent n fetches ago. If the group of instructions fetched contained a branch instruction whose branch was taken, then a "1" may be indicated in the global history vector corresponding to that group of instructions. Otherwise, a "0" may be indicated in the global history vector. That is, a "0" may be indicated in the global history vector if the corresponding group of instructions did not contain a branch instruction or if the group of instructions did contain one or more conditional branch instructions and each of these branches were not taken. Upon each successive fetch of a group of instructions, the global history vector is updated by shifting in an appropriate "1" or "0" and discarding the oldest bit.

The GHV is generally exclusive ORed with the Instruction Fetch Address Register (IFAR), and the resulting address is used to address a portion of the Branch History Tables (BHT). The calculation of both GHV and the IFAR is generally critical to cycle time, which is a key measure of processor efficiency. Also, conventional use of the GHV requires the GHV be folded along upper and lower bits before XORing the folded GHV values with the IFAR. Precious system resources and time are utilized as GHV address and IFAR address are individually calculated. Also, a measurable amount of scarce system resources and time are required when the addresses of the GHV and IFAR are exclusive ORed together.

SUMMARY OF ILLUSTRATIVE EMBODIMENTS

Disclosed are a method, processor configuration and data processing system for reducing an amount of logic and reducing a cycle time required to complete an exclusive OR (XOR) operation on a global history vector (GHV). A GHV mechanism maintains a folded GHV with higher order entries as well as an unfolded GHV with lower order entries. When a new entry of a most recent branch result arrives at the unfolded GHV, the GHV mechanism XORs the oldest unfolded entry in the unfolded GHV with the new entry. The result of the XOR operation is then shifted into the folded GHV as the newest entry, which discards the previous oldest entry of the folded GHV during the shift in of the newest entry. The GHV mechanism thus provides a resulting folded GHV for XORing with an IFAR by performing a single bit XOR operation.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 2 illustrates a logic diagram of logic components utilized to perform a fold of the global history vector (GHV) in accordance with one embodiment of the invention;

DETAILED DESCRIPTION OF AN ILLUSTRATIVE EMBODIMENT

Figure 1:
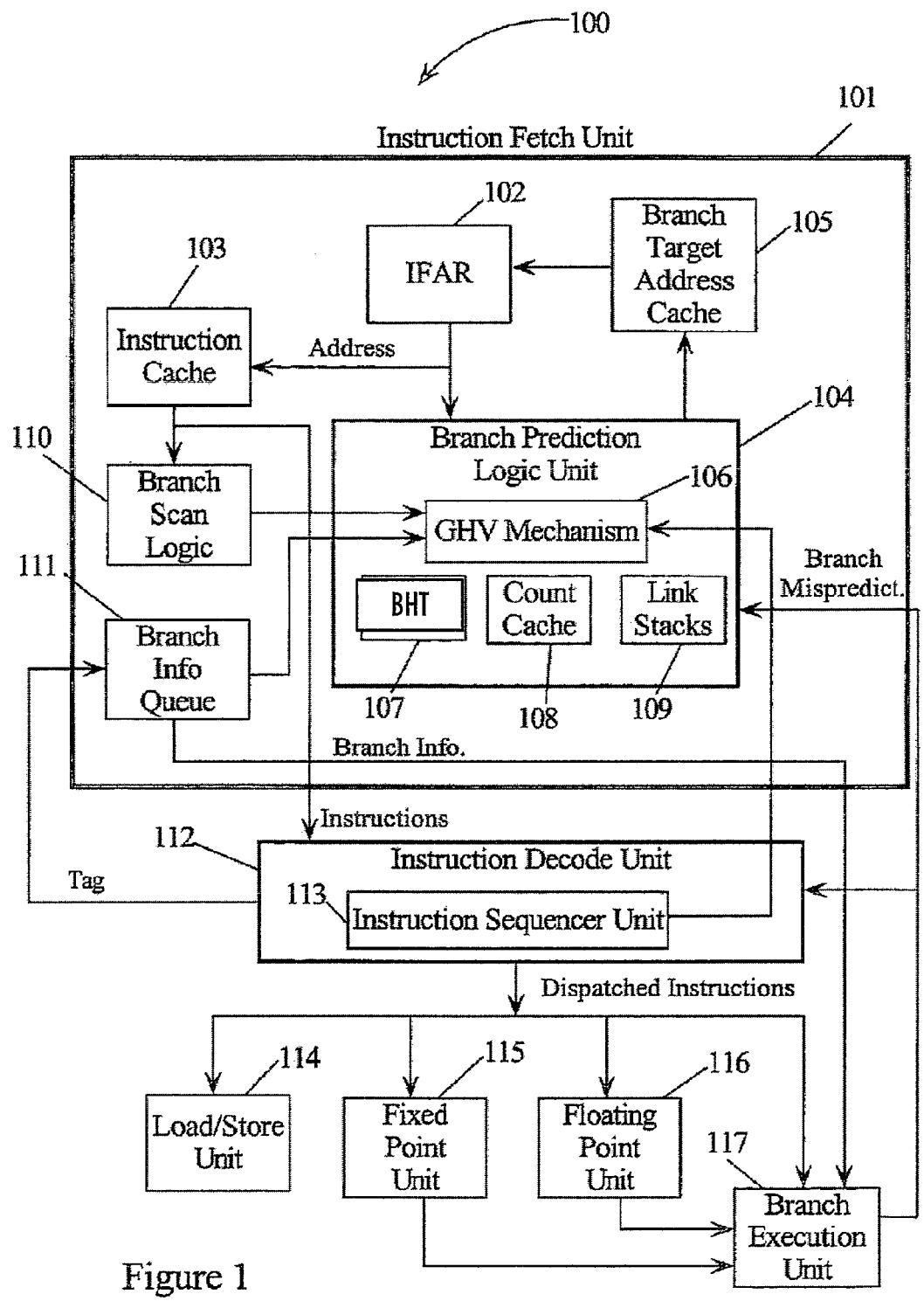
FIG. 1 is a block diagram of a data processing system in which the features described herein may be implemented, in accordance with the illustrative embodiments.

The illustrative embodiments provide a method, processor configuration and data processing system for reducing an amount of logic and reducing a cycle time required to complete an exclusive OR (XOR) operation on a global history vector (GHV). A GHV mechanism maintains a folded version of the GHV as well as an unfolded version. When a new entry of a most recent branch result arrives at the unfolded GHV, the GHV mechanism XORs the oldest entry in the unfolded GHV with the new entry. The result of the XOR operation is then shifted into the folded GHV as the newest entry, which discards the previous oldest entry of the folded GHV during the shift in of the newest entry. The GHV mechanism thus provides a resulting folded GHV that is current and can be utilized for XORing with an IFAR, when needed, by performing a single bit XOR operation. This prevents the GHV mechanism from having to perform multiple different XORs at the time the resulting address is needed at the branch history table. Also, only a single XOR logic is required to perform a single bit XOR operation between the oldest entry and the youngest entry.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 illustrates an example processor 100, in which the illustrative embodiments are implemented. Processor 100 comprises an instruction fetch unit 101 comprising an instruction fetch address register (IFAR) 102 coupled to an instruction cache 103, a branch prediction logic unit 104, and a branch target address cache (calculator) 105. In the illustrative embodiment, IFAR comprises an N bit register that maintains the address of the instruction. Of these N bits, 11 bits are utilized to address the BHT and the Global BHT, according to the illustrative embodiments. The number N is a function of the architecture aid is variable. Different configurations of IFAR (i.e., different number of address bits) may result in a change in the number of bits maintained by the GHV, as will become clear below with the descriptions of FIGS. 3 and 4. Instruction fetch unit 101 also comprises a branch scan logic unit 110 coupled to instruction cache 103, and a branch information queue 111.

Branch prediction logic unit 104 comprises a global history vector (GHV) mechanism 106, branch history tables (BHTs) 107, a count cache 108 and link stacks 109. Branch history tables 107 contain counters, which maintain a value which is used for making a prediction (taken/not taken) for the conditional branch instruction. Count cache 108 and link stacks 109 refer to mechanisms used to predict target addresses for certain types of branch instruction where the target address cannot be directly determined from the instruction itself. Additional details regarding branch history tables 107, count cache 108 and link stacks 109 are not germane to the described embodiments and not described further. During processing, the GHV mechanism 106 exclusive ORs (XOR) the GHV value with the IFAR to provide an address to the count cache 108, and some of the BHT arrays (107).

Branch scan logic unit 110 is configured to scan a copy of instructions fetched from instruction cache 103 to detect the presence of any branch instructions. Branch scan logic unit 110 transmits a command to global history vector mechanism 106. If the group of instructions fetched contained a branch instruction whose branch was taken, then GHV mechanism 106 may insert a "1" into the "most recent" position in the global history vector (GHV) to indicate that a branch was taken corresponding to that group of instructions, discard the "oldest" bit and shift the other bits one position in the direction associated with "older" fetch groups. Specifically, GHV mechanism 106 shifts in a 1 when the branch target address cache (BTAC) selects a target. If the group of instructions fetched did not contain a branch instruction whose branch was taken, GHV mechanism 106 may insert a "0" in the global history vector, discard the oldest bit and shift the other bits one position in the direction associated with "older" fetch groups. Also, when a sequential fetch occurs, the GHV mechanism 106 also shifts in a 0 to the GHV.

In some processor configurations, the icache access/branch scan logic is a three cycle path, while other configurations have other branch scan lengths. With a three cycle branch scan path, the machine can have two sequential fetches before we fetching the target. When the branch scan logic causes a branch redirect, the GHV mechanism shifts a 1 (for the taken branch) into the GHV that was used to fetch the group of instructions, which contained the taken branch.

The illustrated configuration of processor 100 and components illustrated therein may be provided within a data processing system and are presented herein for illustrative purposes only. Those skilled in the art understand that various functional features of the described embodiments are fully applicable to a system configuration that is differently configured and comprises different components than those illustrated, and the presentation of one such embodiment/configuration does not limit in any way the scope of the illustrative embodiments or their equivalents.

Processor 100 further comprises an instruction decode unit 112 coupled to components within instruction fetch unit 101. Instruction decode unit 112 comprises an instruction sequencer unit 113. Processor 100 further comprises execution units, namely, load/store unit 114, fixed point unit 115, floating point unit 116 and branch execution unit 117.

In the illustrative embodiment, GHV mechanism 106 generates and maintains a folded GHV of higher order bits (0:M) in addition to the unfolded GHV with lower order bits (M+1:N), where N is the total number of bits required to produce the folded result. Specifically, the unfolded lower bits of the GHV are also stored. As introduced above and described in further detail below, the described embodiments remove the requirement for the GHV mechanism 106 to perform a series of XOR operations on the entire GHV and wasting valuable cycle time and the need for additional XOR logic. A single bit XOR logic/gate provides the required folded vector that is ultimately XORed with the IFAR 102 to yield a resulting address for some of the branch history tables (BHTs).

When a bit is to be shifted, the oldest unfolded GHV bit is folded/shifted with the youngest branch result. Then, the result of the fold is then shifted into the end of the folded GHV. No XOR is required for the remainder of the folded GHV, as they are simply shifted. This single XOR and shifting results in a timing saving, as well as the saving of XOR gates and real estate on the processor.

Figure 3:
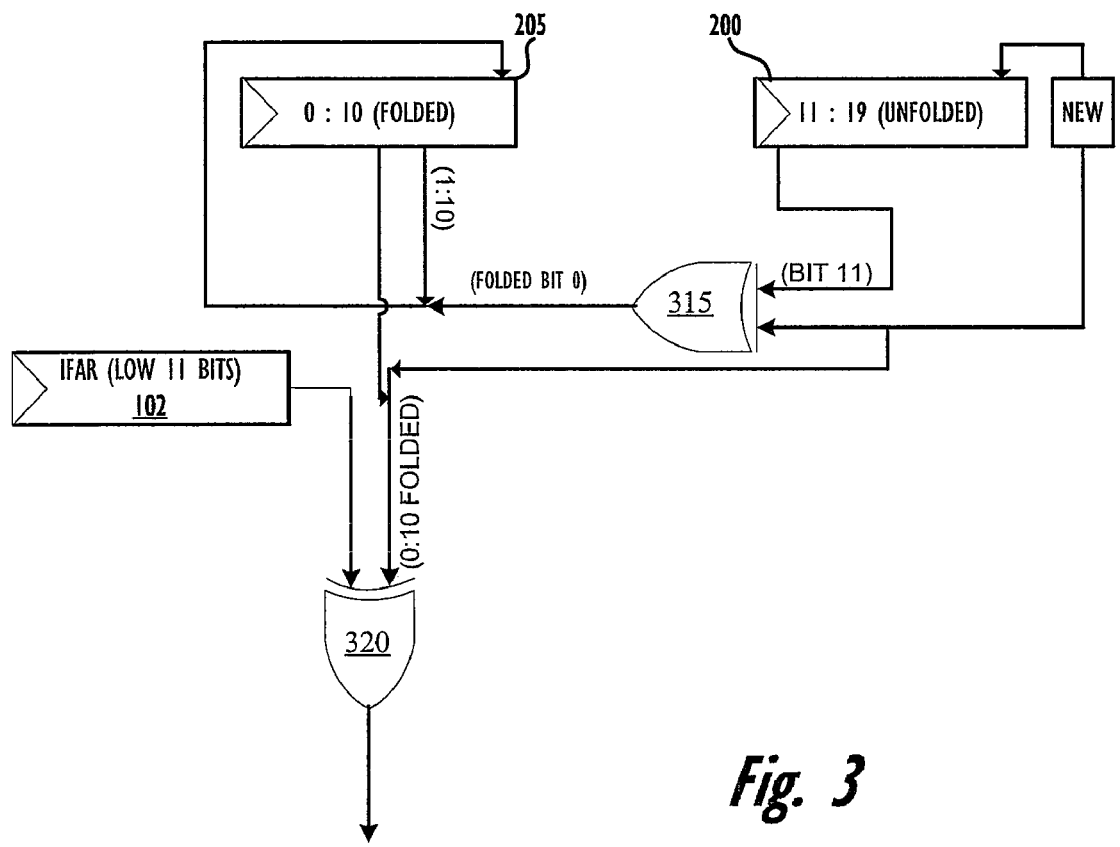
FIG. 3 illustrates an example sequence of GHVs, one folded and the other unfolded, containing the single bit entries that are shifted and updated, respectively, during folding operations utilizing a single bit XOR operation, according to one embodiment.

By way of example, FIG. 3 illustrates an example logic configuration of the GHV mechanism 106 within which the folded GHV is generated and maintained as new (younger) branch results are mapped to the last entry of the unfolded GHV. The configuration of GHV mechanism 106 enables the GHV mechanism to maintain the folded GHV without requiring an XORing of the entire set of unfolded GHV bits each time a new entry is received. GHV mechanism 106 comprises unfolded GHV 200 and folded GHV 205 indicates as two latches, sized according to the number of entries (bits) maintained by the GHV. As illustrated, the first latch of folded GHV 205 holds the full complement of folded bits, specifically the higher order bits (0:10) that are folded with the lower bits of IFAR 102. The second latch, representing unfolded GVH 200, holds the lower order, most recently received, unfolded bits (11:19). In the illustrative embodiment, bit 19 represents the youngest (most recently received) branch result, while bit 11 represents the oldest unfolded bit/entry.

GHV mechanism 106 further comprises two XOR logics, first XOR logic 315 and second XOR logic 320. GHV mechanism 106 utilizes first XOR 315 to perform a single XORing of the youngest entry of unfolded GHV (bit 19) with the oldest unfolded bit (bit 11; bits 0:10 are folded) to generate a new folded entry. The resulting folded entry is automatically shifted into folded GHV 205 as the newest entry, while the oldest entry of folded GHV 205 is shifted out of folded GHV

205 and discarded. As shown, the resulting folded entry becomes entry 10, which is concatenated with the original entries 1:10 to form the new entries 0:10, where the original entries 1:10 are each shifted one position left (and become entries 0:9). GHV mechanism 106 then utilizes second XOR logic 320 to perform the XORing of the 11 lower bits in the IFAR with the 11 folded bits (0:10) of the folded GHV 205. The resulting vector of 11 bits then represents the calculated BHT address.

Referring now to FIG. 2, which illustrates a set of example folded GHVs 205 and unfolded GHVs 200, according to an illustrative embodiment. As shown by the particular example, folded GHV 205 contains M total entries (0:10), with each entry having a bit value representing the result of folding new branch results with the oldest unfolded entry (bit 11) before the new branch result is shifted into the unfolded GHV 200. Unfolded GHV 200 contains N-M total entries (11:19), each holding a bit value for a branch result in an unfolded manner. Two cycle times are shown by FIG. 2, namely original time T0, at which the current values of the entries within the GHVs 200, 205 are shown below their respective bit numbers (11:19, and 0:10, respectively), and then at time T1 after a 1 is received as the youngest branch result.

Thus, at cycle T0, folded GHV 205 has a value of 10010100000, while unfolded GHV 200 has a value of 010110001. GHV mechanism 106 has an awareness of which GHV has folded bits versus unfolded bits. The second time T1 illustrates the changes to the entries of both GHVs 200 and 205 when the GHV mechanism receives a 1 as the youngest branch result. As shown, the value of the entries of folded GHV 205 transitions/changes to 001000001, while the entries of folded GHV 200 transition/change to 101100011.

As illustrated by FIG. 3, when the GHV mechanism 106 receives a new youngest branch result of 1 at cycle time T1, the first XOR logic 315 folds the recently received youngest branch result (in this case 1) with the oldest entry from bit 11 of unfolded GHV 200 (which in this case is 0), to yield a folded result of 1. The GHV mechanism 106 shifts in the result (1) into the folded GHV 205 at entry 10. As shown, the resulting set of entries within folded GHV 205 include the new value (1) at entry 10, concatenated with the other values (1:10) shifted one position to the left. The original value for entry 0 is discarded and replaced by the original value of entry 1. The actual resulting bit values are provided within the lower box of each entry. Unfolded GHV 200 also shifts to the left, discarding original value of entry 11 and inserting the new branch results into entry 19, as shown at cycle time T1.

Again referencing FIG. 2, and specifically cycle time T2, at which GHV mechanism receives a youngest branch result of 0. Similarly to the above description, the youngest branch result is XORed (315) with the value of entry 11, the result of that XOR operation is then shifted into entry 10 of the folded GHV 205. Also, the youngest branch result is shifted into the unfolded GHV 200.

During processing, the GHV mechanism 106 receives information about branch predictions and maintains/updates the unfolded GHV 200 and folded GHV 205, accordingly. When the GHV detects a redirection of the IFAR 102, the GHV mechanism 106 restores the GHVs 200, 205 to the value that would have resulted had the redirection not occurred. That is, when the GHV mechanism 106 receives information indicating that a branch misprediction occurred, the GHV mechanism 106 restores the GHVs 200, 205 to the value of the GHVs 200, 205 after the branch is correctly predicted.

The GHV mechanism 106 includes logic for performing the shift in of the new entry and the shift of the existing entries within the folded GHV 205 and unfolded GHV 200. In one embodiment, a first logic deletes the contents of the oldest folded GHV entry (bit) to accommodate the new entry. Thereafter, a second logic shifts the contents of the second oldest entry (e.g., bit position 1) to the oldest entry (bit position 0), then shifts the contents of the third oldest entry (e.g., bit position 2) to the second oldest entry (bit position 1), and so on. This process of continues until the contents of last entry in the sequence is shifted into the second to last entry, leaving the last entry available for receiving the new entry. It is appreciated that a reverse scheme may be utilized in an alternate configuration in which bit position 19 may be the oldest entry, with 18 being the second oldest entry, and so on.

The above configuration of GHV mechanism 106, with folded GHV 205 provides a performance benefit over folding the entire unfolded GHV vector 200. The illustrative embodiment enables the GHV folding to occur without adding delay to the calculation of the address to the BHTs. The unfolded GHV maintains all of the unfolded bits (11:19), however only two bits are utilized when folding (XORing) to generate the folded GHV 205. That is, rather than simply maintaining the entire set of bits (0:19) in an unfolded GHV and then performing the folding at the time when the resulting folded vector is required to be folded (XORed) with the address bits within the IFAR, the GHV mechanism maintains the folded version of the GHV so that the additional folding step is eliminated form the cycle time.

In one embodiment, a single GHV contains both folded bits and unfolded bits, and the GHV is thus referred to as a partially folded GHV. The upper order bits of the GHV store only folded values, while the lower order bits store unfolded values. Thus, for example, of the N entries of the partially folded GHV, a upper order set of M bits (i.e., bits corresponding to the first in sequence of bits), namely bits 0 through 10, where M=11 are folded. Also, a lower order set of N-M bits (i.e., bits corresponding to the last sequence of bits), namely bits 11 through 19, are unfolded.

The partially folded GHV accumulates information on a per fetch group basis. The partially folded GHV contains unfolded bits, including bit 19 into which the youngest (most recent) branch results shifts, and folded bits (0:10). The first XOR logic 315 performs an XOR operation of unfolded bits 19 and bit 11, and the result of this XOR operation is shifted into bit 10. This method permits use of a single XOR rather than 10 XORs to generate the folded GHV 205. The GHV mechanism 106 enables XORing of an early unfolded part of the GHV with a later unfolded part of the vector for improved performance. With this implementation, the timing path no longer has 3 XORs in the critical path. Rather only two XORs are needed, one of which is a single bit XOR. Thus, rather than tracking the last 20 GHVs, the modified GHV mechanism 106 enables the GHV mechanism to track the most recent 10 entries and utilize those entries to maintain/update the folded portion of the vector. The least recent XOR is then tracked and updated with the most recent entries.

Figure 4:
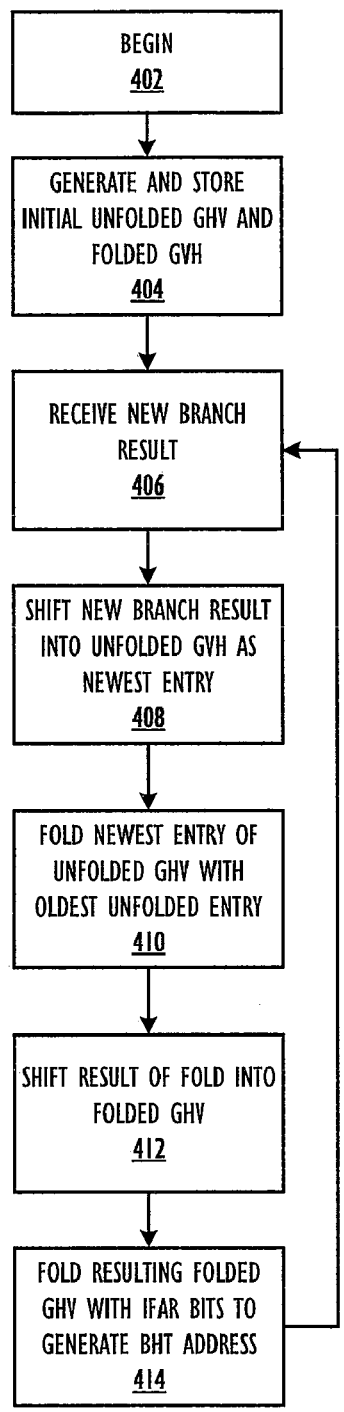
FIG. 4 illustrates a flow chart of the method which completes a single bit folding and shifting for a multiple bit folded GHV, according to one embodiment.

Referring now to FIG. 4, there is illustrated a flow chart of the method by which the above mentioned processes of the illustrative embodiments are completed. The process of FIG. 4 begins at block 402, and proceeds to block 404 at which the GHV mechanism generates and stores an initial version of the folded GHV 205 and unfolded GHV 200. The, the GHV mechanism 106 receives a new (young) branch result entry at block 406. The GHV mechanism shifts the new branch result into the unfolded GHV 200 at block 408. The GHV mechanism also folds (XORs) the new branch result (entry) with the oldest unfolded branch result entry in the unfolded GVH 200, as provided at block 410. At block 412, the GHV mechanism also shifts the folded result into the folded GHV 205 by performing a bitwise that removes the oldest folded result from the folded GHV. At block 414, the GHV folds the resulting folded GVH 205 with the lower address bits of the IFAR 102 to generate an address for the BHTs. The process then continues with the GVH mechanism 106 continually updating the folded GVH 205 as new entries are received. The GHV mechanism 106 thus maintains the folded GVH 205 in a current state.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Notably, while an illustrative embodiment of the present invention is described in the context of a storing the upper bits of the GHV in the unfolded manner, those skilled in the art will appreciate that an illustrative embodiment of the present invention applies equally regardless of whether the upper bits or the lower bits are stored in the folded manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A processor comprising:
    an instruction fetch unit (IFU) having:
        an instruction fetch address register (IFAR);
        a global history vector (GHV) mechanism coupled to the IFAR and which includes:
            an unfolded GHV having a plurality of entries for tracking groups of fetched instructions, each entry providing a bit indicating whether the group included a branch that was taken, and wherein unfolded means that no logical exclusive OR (XOR) has been performed on each entry;
            a folded GHV having a plurality of entries, which provides M folded entries, each entry providing a bit representing a result of folding two entries of the unfolded GHV, where M is less than N, and wherein folding means logically XORing the two entries of the unfolded GHV;
            first logic for folding a newly received, youngest branch result with an oldest unfolded entry in the unfolded GHV to provide a newest folded result;
            logic for shifting the newest folded result into the folded GHV to provide an updated folded GHV; and
            second logic for folding the updated folded GHV with a subset of bits from the IFAR to produce a resulting address that is utilized to address one or more branch history tables.

2. The processor of claim 1, wherein the first and second logic for folding are exclusive OR (XOR) logic.

3. The processor of claim 1, wherein the GHV mechanism further comprises:
    third logic for shifting the newly received, youngest branch result into the unfolded GHV; and
    wherein the logic and third logic for shifting comprises logic for performing a bit-wise shift of the entries in the folded and unfolded GHV, respectively.

4. The processor of claim 1, wherein:
    N equals 20 and M equals 11, and the subset of IFAR bits is 11 bits;
    the entries of the unfolded GHV and the folded GHV are sequentially assigned from 11 to 19 and 0 to 10, respectively, with entry 0 representing the oldest folded entry;
    the first logic for folding receives entry 11 of the unfolded GHV as the oldest unfolded entry; and
    the logic for shifting the newest folded result into the folded GHV shifts the newest folded result into entry 10 of the folded GHV, wherein content of a previous entry 0 is shifted out of the GHV and replaced by content from the previous entry 1.

5. A data processing system comprising:
    a memory subsystem; and
    a processor having execution units and an instruction cache, coupled to the memory subsystem, said processor including:
    an instruction fetch unit (IFU) having:
        an instruction fetch address register (IFAR);
        a global history vector (GHV) mechanism coupled to the IFAR and which includes:
            an unfolded GHV having a plurality of entries for tracking N groups of fetched instructions, each entry providing a bit indicating whether the group included a branch that was taken, and wherein unfolded means that no logical exclusive OR (XOR) has been performed on each entry;
            a folded GHV having a plurality of entries, which provides M folded entries, each entry providing a bit representing a result of folding two entries of the unfolded GHV, where M is less than N, and wherein folding means logically XORing the two entries of the unfolded GHV;
            first logic for folding a newly received, youngest branch result with an oldest unfolded entry in the unfolded GHV to provide a newest folded result;
            logic for shifting the newest folded result into the folded GHV to provide an updated folded GHV; and
            second logic for folding the updated folded GHV with a subset of bits from the IFAR to produce a resulting address that is utilized to address one or more branch history tables.

6. The data processing system of claim 5, wherein the first and second logic for folding are exclusive OR (XOR) logic.

7. The data processing system of claim 5, wherein the GHV mechanism further comprises:
    third logic for shifting the newly received, youngest branch result into the unfolded GHV; and wherein the logic and third logic for shifting comprises logic for performing a bit-wise shift of the entries in the folded and unfolded GHV, respectively.

8. The data processing system of claim 5, wherein:

N equals 20 and M equals 11, and the subset of IFAR bits is 11 bits;

the entries of the unfolded GHV and the folded GHV are sequentially assigned from 11 to 19 and 0 to 10, respectively, with entry 0 representing the oldest folded entry;

the first logic for folding receives entry 11 of the unfolded GHV as the oldest unfolded entry; and the logic for shifting the newest folded result into the folded GHV shifts the newest folded result into entry 10 of the folded GHV, wherein content of a previous entry 0 is shifted out of the GHV and replaced by content from the previous entry 1.

9. In a data processing unit having an instruction cache, an instruction fetch unit (IFU) with an instruction fetch address register (IFAR), and branch prediction unit, a method for efficiently tracking branch results, the method comprising:

providing an unfolded global history vector (GHV) and a folded GHV within a GHV mechanism;

maintaining both the unfolded GHV and the folded GHV within the GHV mechanism, wherein (a) the unfolded GHV has a plurality of entries for tracking at least N groups of fetched instructions, each entry providing a bit indicating whether the group included a branch that was taken, and wherein unfolded means that no logical exclusive OR (XOR) has been performed on each entry, and (b) the folded GHV has a plurality of entries, which provides M folded entries, each entry providing a bit representing a result of folding two entries of the unfolded GHV, where M is less than N, and wherein folding means logically XORing the two entries of the unfolded GHV; and responsive to receipt of a youngest branch result;

folding a newly received, youngest branch result with an oldest unfolded entry in the unfolded GHV to provide a newest folded result;

shifting the newest folded result into the folded GHV to provide an updated folded GHV; and folding the updated folded GHV with a subset of bits from the IFAR to produce a resulting address that is utilized to address one or more branch history tables.

10. The method of claim 9, wherein the first and second logic for folding are exclusive OR (XOR) logic.

11. The method of claim 9, further comprising:

shifting the newly received, youngest branch result into the unfolded GHV; and wherein the shifting includes performing a bit-wise shift of the entries in the folded GHV.

12. The method of claim 8, wherein:

N equals 20 and M equals 11, and the subset of IFAR bits is 11 bits;

the entries of the unfolded GHV and the folded GHV are sequentially assigned from 11 to 19 and 0 to 10, respectively, with entry 0 representing the oldest folded entry;

the folding of the newly received, youngest branch result with the oldest unfolded entry utilizes entry 11 of the unfolded GHV as the oldest unfolded entry; and the shifting of the newest folded result into the folded GHV shifts the newest folded result into entry 10 of the folded GHV, wherein content of a previous entry 0 is shifted out of the GHV and replaced by content from the previous entry 1.

* * * * *